US009679722B2

(12) United States Patent
Mun et al.

(10) Patent No.: US 9,679,722 B2
(45) Date of Patent: Jun. 13, 2017

(54) INTERLOCK APPARATUS OF VACUUM CIRCUIT BREAKER

(71) Applicant: LSIS CO., LTD., Anyang-si, Gyeonggi-do (KR)

(72) Inventors: Seung Hwan Mun, Cheongju-si (KR); Dae Soo Han, Cheongju-si (KR); Kil Young Ahn, Daejon (KR); Seung Pil Yang, Cheongju-si (KR)

(73) Assignee: LSIS CO., LTD., Anyang-si (KR)

( * ) Notice: Subject to any disclaimer, the term of this patent is extended or adjusted under 35 U.S.C. 154(b) by 24 days.

(21) Appl. No.: 14/748,087

(22) Filed: Jun. 23, 2015

(65) Prior Publication Data
US 2016/0126036 A1    May 5, 2016

(30) Foreign Application Priority Data
Oct. 30, 2014    (KR) .......................... 10-2014-0149449

(51) Int. Cl.
*H01H 33/48* (2006.01)
*H01H 33/66* (2006.01)
(Continued)

(52) U.S. Cl.
CPC ............ *H01H 33/48* (2013.01); *H01H 33/66* (2013.01); *H02B 3/00* (2013.01); *H02B 11/133* (2013.01); *H02B 11/167* (2013.01)

(58) Field of Classification Search
CPC .......... H01H 33/48; H01H 33/66; H01H 9/20; H02B 11/167; H02B 11/133; H02B 3/00; H02B 11/24
(Continued)

(56) References Cited

U.S. PATENT DOCUMENTS

| 7,057,123 B1 | 6/2006 | Jenkins et al. |
| 8,481,875 B2 * | 7/2013 | Park ................ H02B 11/133 |
| | | 200/50.27 |

(Continued)

FOREIGN PATENT DOCUMENTS

| JP | 59-117215 | 8/1984 |
| JP | 62-23307 | 1/1987 |

(Continued)

OTHER PUBLICATIONS

Korean Intellectual Property Office Application Serial No. 10-2014-0149449, Office Action dated Mar. 21, 2016, 4 pages.
(Continued)

*Primary Examiner* — Edwin A. Leon
(74) *Attorney, Agent, or Firm* — Lee, Hong, Degerman, Kang & Waimey PC (57) ABSTRACT

There is provided an interlock apparatus of a vacuum circuit breaker for adjusting withdrawal of a circuit breaker main body, which is installed in a truck and moves to a connected position in which the circuit breaker main body is connected to a cradle and moves to a disconnected position in which the circuit breaker main body is separated from the cradle within the cradle, to outside of the cradle, includes: a lift including a rotation adjusting plate provided on an upper portion thereof, and moving forwardly and backwardly such that the rotation adjusting plate is inserted into the interior of the cradle or separated from the cradle; and an interlock plate provided within the cradle and rotating according to movement of the rotation adjusting plate so as to be tightly attached to the truck or released from the tightly attached state to thereby adjust withdrawal of the circuit breaker main body to the outside of the cradle.

8 Claims, 7 Drawing Sheets

(51) Int. Cl.
  *H02B 3/00*    (2006.01)
  *H02B 11/133*  (2006.01)
  *H02B 11/167*  (2006.01)
(58) Field of Classification Search
  USPC .......................................... 200/50.23, 50.12
  See application file for complete search history.

(56) References Cited

U.S. PATENT DOCUMENTS

| 8,604,368 | B2* | 12/2013 | Kim ...................... | H02B 11/24 |
| | | | | 200/50.22 |
| 8,710,390 | B2* | 4/2014 | Kim .................... | H02B 11/133 |
| | | | | 218/140 |
| 8,878,088 | B2* | 11/2014 | Webb .................... | H02B 11/10 |
| | | | | 200/337 |

FOREIGN PATENT DOCUMENTS

| JP | 2-33508 | 3/1990 |
| KR | 10-0831050 | 5/2008 |
| KR | 10-2010-0101989 | 9/2010 |

OTHER PUBLICATIONS

European Patent Office Application Serial No. 15173616.2, Search Report dated Mar. 3, 2016, 9 pages.

* cited by examiner

INTERLOCK APPARATUS OF VACUUM CIRCUIT BREAKER

CROSS-REFERENCE TO RELATED APPLICATION

Pursuant to 35 U.S.C. §119(a), this application claims the benefit of earlier filing date and right of priority to Korean Application No. 10-2014-0149449, filed on Oct. 30, 2014, the contents of which is incorporated by reference herein in its entirety.

BACKGROUND OF THE INVENTION

1. Field of the Invention

The present disclosure relates to an interlock apparatus of a vacuum circuit breaker, and particularly, to an interlock apparatus of a vacuum circuit breaker capable of preventing occurrence of an accident when an operator takes a circuit breaker main body from the interior of a cradle.

2. Background of the Invention

In general, a vacuum circuit breaker (VCB) is a circuit breaker for extinguishing an arc in a vacuum state, and is mainly used as a high voltage circuit breaker using high dielectric strength in a vacuum state.

Vacuum circuit breakers have a short circuit breaking time, have breaking performance not affected by a frequency, are low-noise type breakers without explosion when manipulated, and do not use oil, reducing fire hazard.

Also, vacuum circuit breakers may be manufactured to have a small size and have a simple structure, facilitating maintenance, and recently, 22.9 kV class vacuum circuit breakers are commonly used.

Vacuum circuit beakers are classified as a fixed type vacuum circuit breaker and a drawer type vacuum circuit breaker, and the drawer type circuit breaker includes a circuit breaker main body and a cradle.

According to a degree to which a circuit breaker main body is drawn in or drawn out from the cradle, the drawer type circuit breaker may be in a disconnected position in which both a main circuit and a control circuit are separated, a test position in which the main circuit is separated and the control circuit is connected, and a connected position in which both the main circuit and the control circuit are connected.

Figure 1:
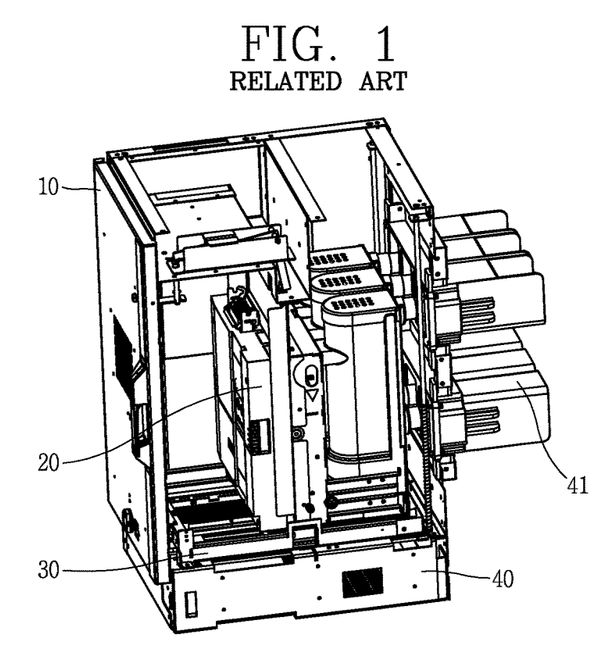
FIG. 1 is a view schematically illustrating an internal configuration of a cradle of a vacuum circuit breaker in a connected position.
Figure 2:
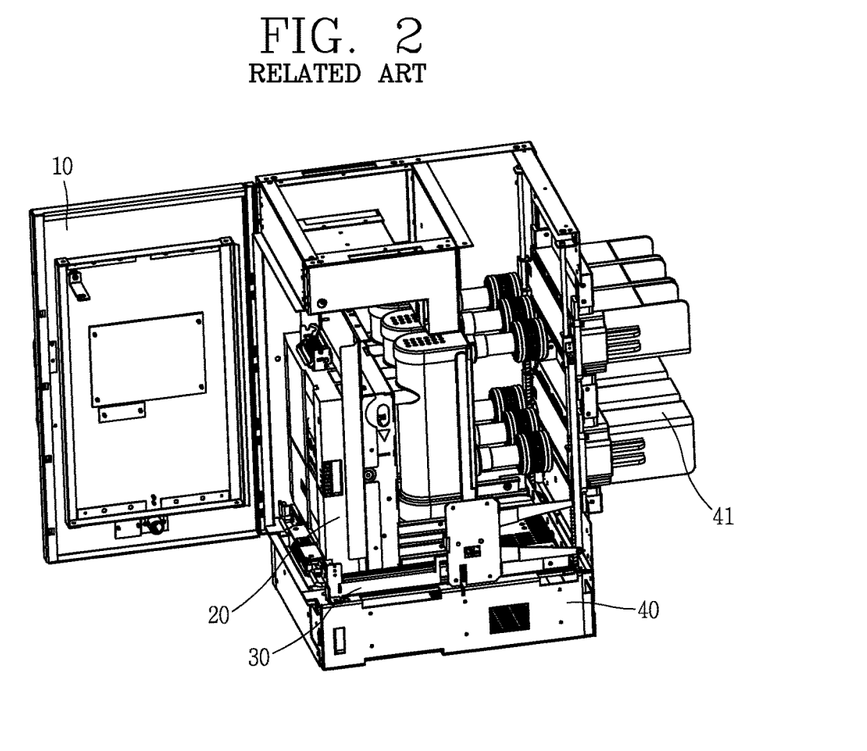
FIG. 2 is a view schematically illustrating an internal configuration of the cradle of the vacuum circuit breaker in a test position.

FIG. 1 is a view schematically illustrating an internal configuration of a vacuum circuit breaker in a connected position. FIG. 2 is a view schematically illustrating an internal configuration of the vacuum circuit breaker in a test position, and FIG. 3 is a view schematically illustrating an internal configuration of the vacuum circuit beaker in a disconnected position.

Figure 3:
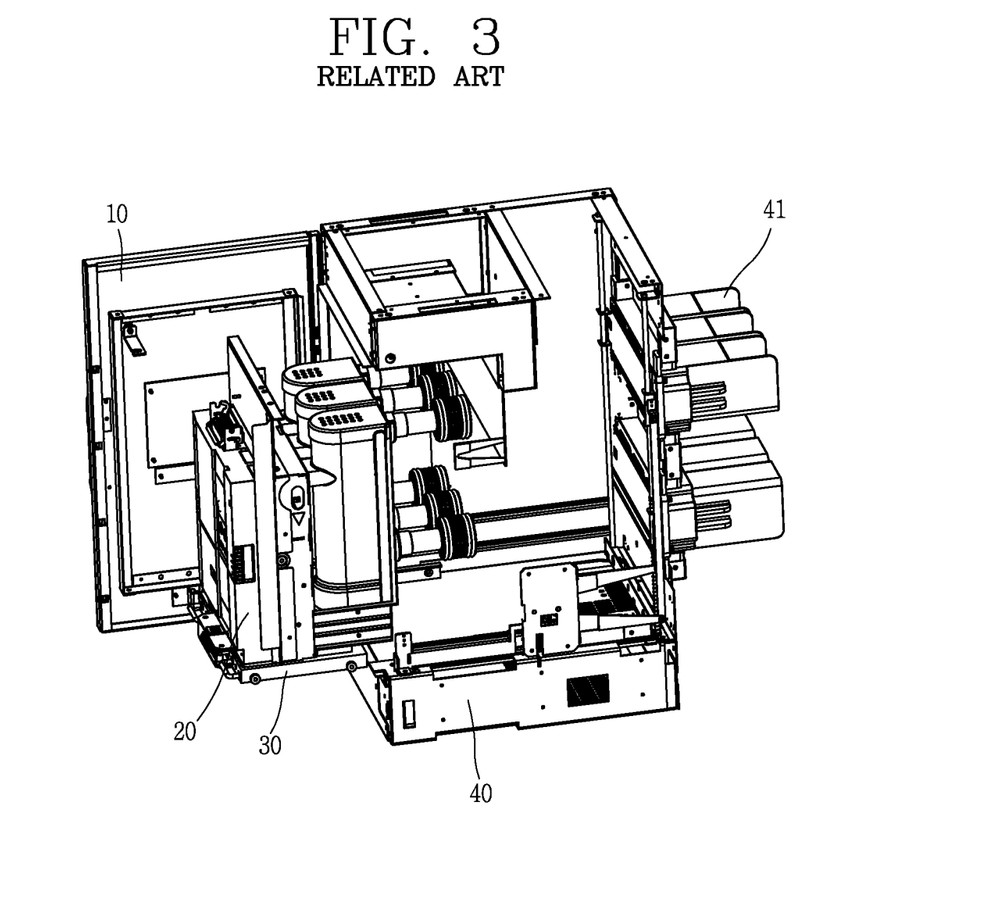
FIG. 3 is a view schematically illustrating a state in which a circuit breaker main body of the vacuum circuit breaker is drawn out from the cradle.

As illustrated in FIGS. 1 through 3, the vacuum circuit beaker includes a cradle 40 to which a door 10 is coupled, a truck 30 in which a circuit breaker main body 20 is installed, and the circuit breaker main body 20 installed in the truck 30 and moving within the cradle 40.

The cradle 40 provides a space allowing the truck 30 with the circuit breaker main body 20 loaded on an upper portion thereof to move in a forward/backward direction therein, and the circuit breaker main body 20, in a state of being loaded on the upper portion of the truck 30, moves in the forward/backward direction within the cradle 40 so as to be coupled to or separated from a terminal 41 formed within the cradle 40, thus applying or cutting off a current.

In the related art circuit breaker configured as described above, in the test position, the circuit breaker main body 20 positioned on the upper portion of the truck 30 is separated from the terminal 41 provided within the cradle 40, cutting off application of a current, and in the connected position, the truck 30 moves to the interior of the cradle 40 so as to be coupled to the terminal 41 within the cradle 40, and thus, a current is applied.

However, in a case in which the circuit breaker main body 20 is drawn out from the cradle 40, for replacement thereof, in the test position, since a device for supporting the circuit breaker main body 20 is not provided outside of the cradle 40, the drawn-out circuit breaker main body 20 may fall to lead to a high possibility that an operator may be physically damaged.

Also, when the circuit breaker main body 20 falls to be damaged, the circuit breaker main body 20 should be replaced with a new one, significantly increasing cost.

SUMMARY OF THE INVENTION

Therefore, an aspect of the detailed description is to provide an interlock apparatus of a vacuum circuit breaker capable of preventing an occurrence of an accident of an operator when the vacuum circuit breaker is drawn out.

To achieve these and other advantages and in accordance with the purpose of this specification, as embodied and broadly described herein, an interlock apparatus of a vacuum circuit breaker for adjusting withdrawal of a circuit breaker main body, which is installed in a truck and moves to a connected position in which the circuit breaker main body is connected to a cradle and moves to a disconnected position in which the circuit breaker main body is separated from the cradle within the cradle, to outside of the cradle, may include: a lift including a rotation adjusting plate provided on an upper portion thereof, and moving forwardly and backwardly such that the rotation adjusting plate is inserted into the interior of the cradle or separated from the cradle; and an interlock plate provided within the cradle and rotating according to movement of the rotation adjusting plate so as to be tightly attached to the truck or released from the tightly attached state to thereby adjust withdrawal of the circuit breaker main body to the outside of the cradle.

An upwardly sloped surface sloped from one side toward a central portion may be formed in an upper end of the interlock plate, a stoppage protrusion may be formed to be spaced apart from the sloped surface by a predetermined distance in an inward direction of the cradle, a stoppage plate may be formed on a lower surface of the truck and protrudes downwardly, and when the rotation adjusting plate is not inserted into the cradle, the stoppage protrusion may be positioned in front of the stoppage plate such that the stoppage plate may be caught by the stoppage protrusion when the circuit breaker main body moves, thus preventing withdrawal of the circuit breaker main body by the interlock plate, and when the rotation adjusting plate is inserted into the cradle, the rotation adjusting plate may push the sloped surface to rotate the interlock plate such that the stoppage protrusion is positioned below the stoppage plate, whereby the circuit breaker main body is drawn out from the cradle.

An upwardly sloped surface sloped from one side toward a central portion may be formed in an upper end of the interlock plate, a stoppage protrusion may be formed to be spaced apart from the sloped surface by a predetermined distance in an inward direction of the cradle, a stoppage plate may be formed on a lower surface of the truck and protrude downwardly, the stoppage protrusion may be positioned in front of the stoppage plate before the rotation adjusting plate is inserted into the cradle, such that the stoppage plate is caught by the stoppage protrusion when the circuit breaker main body moves, thus preventing withdrawal of the circuit breaker main body through the interlock plate, and when the rotation adjusting plate is inserted into the cradle, the rotation adjusting plate pushes the sloped surface to rotate the interlock plate such that the stoppage protrusion is positioned below the stoppage plate, whereby the circuit breaker main body is drawn out from the cradle.

An installation plate on which the circuit breaker main body drawn out from the interior of the cradle is supportedly installed may be formed above the lift, and release preventing plates for preventing the circuit breaker main body from being released from the installation plate may be formed on both sides of the installation plate.

An insertion bar may be provided below the rotation adjusting plate and disposed to be adjacent to the cradle, and an insertion bar accommodation portion may be formed in a position facing the insertion bar such that insertion bar is inserted therein.

The sloped surface may be rounded.

A rotation preventing member may be further formed below one end of the interlock plate in order to limit rotation when the interlock plate rotates in a counterclockwise direction through the stoppage plate.

A pressing protrusion may be formed to be spaced apart from the stoppage protrusion by a predetermined distance in an inward direction of the cradle and protrude downwardly in the interlock plate, and allow one side of an elastic member to be inserted therein, and an elastic member insertion portion may be positioned to be spaced apart from the pressing protrusion by a predetermined distance in a direction opposite to the pressing protrusion within the cradle and allow the other side of the elastic member to be inserted therein.

A movement adjusting plate may be provided in front of the interlock plate, a long hole may be formed in the movement adjusting plate such that the interlock plate moves up and down therein as soon as the interlock plate rotates, and in a state in which the insertion member is inserted into the interlock plate by penetrating through the long hole, when the interlock plate rotates, the insertion member may move up and down in the long hole and the interlock plate may rotate and simultaneously move up and down.

The movement adjusting plate may include a vertical plate including the long hole formed in a portion thereof and positioned to be tightly attached to the interlock plate; and a horizontal plate extending from a lower end of the vertical plate in a horizontal direction and tightly fixed to the cradle through fastening members.

As described above, in the interlock apparatus of a vacuum circuit breaker, in a state in which the lift is not coupled to the cradle, the circuit breaker main body may not be drawn out from the cradle through the interlock plate, and in a state in which the lift is coupled to the cradle, the circuit breaker main body may be drawn out from the cradle. Thus, when the circuit breaker main body is drawn out from the cradle, since the circuit breaker main body is supported by using the lift, whereby an occurrence of an accident of an operator due to fall of the circuit breaker main body can be prevented.

In addition, since the circuit breaker main body is prevented from falling, thus preventing damage to the circuit breaker, an increase in cost due to replacement of the circuit breaker main body can be prevented.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

An interlock apparatus of a vacuum circuit breaker according to an embodiment of the present disclosure will be described in detail with reference to the accompanying drawings.

Figure 4A:
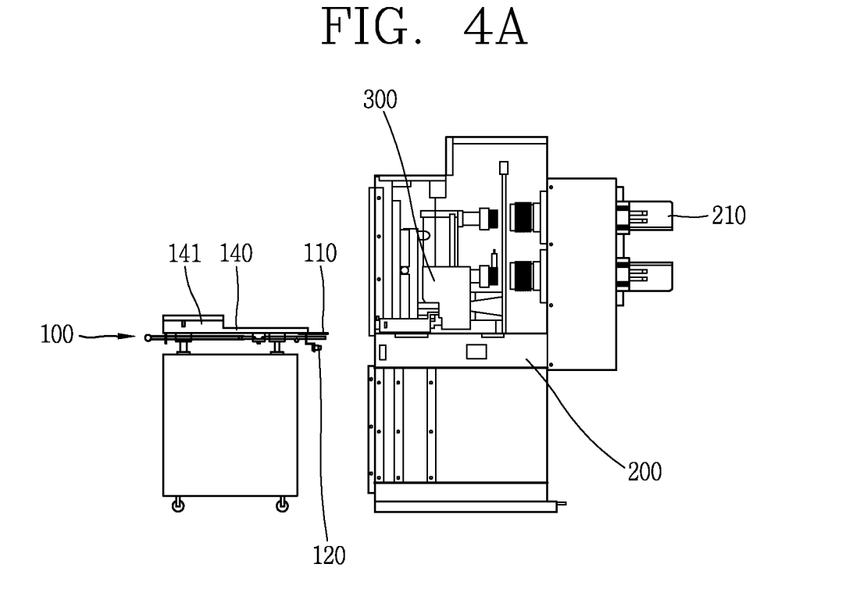
FIG. 4A is a side view illustrating a state before a lift forming an interlock apparatus of a vacuum circuit breaker according to an embodiment of the present disclosure is coupled to a cradle.
Figure 4B:
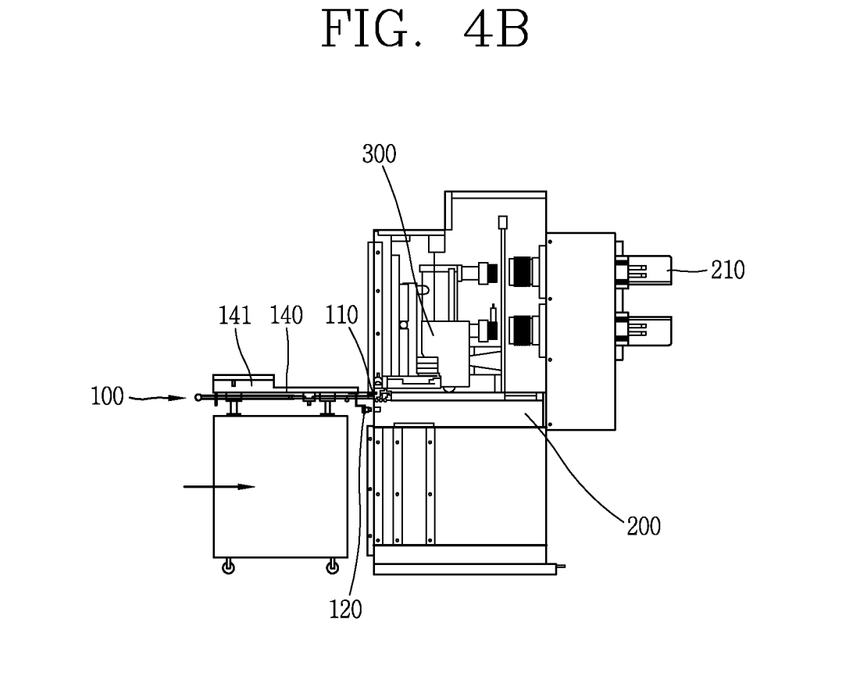
FIG. 4B is a side view illustrating a state in which the lift forming the interlock apparatus of the vacuum circuit breaker according to an embodiment of the present disclosure is coupled to the cradle.
Figure 5:
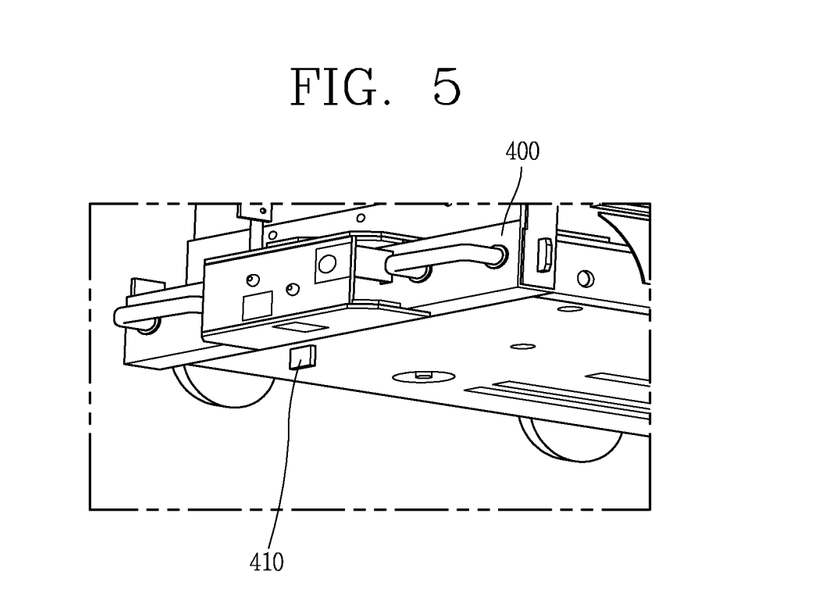
FIG. 5 is a partial perspective view illustrating a state in which a stoppage plate is formed in a truck.

FIG. 4A is a side view illustrating a state before a lift forming an interlock apparatus of a vacuum circuit breaker according to an embodiment of the present disclosure is coupled to a cradle. FIG. 4B is a side view illustrating a state in which the lift forming the interlock apparatus of the vacuum circuit breaker according to an embodiment of the present disclosure is coupled to the cradle. FIG. 5 is a partial perspective view illustrating a state in which a stoppage plate is formed in a truck.

Figure 6:
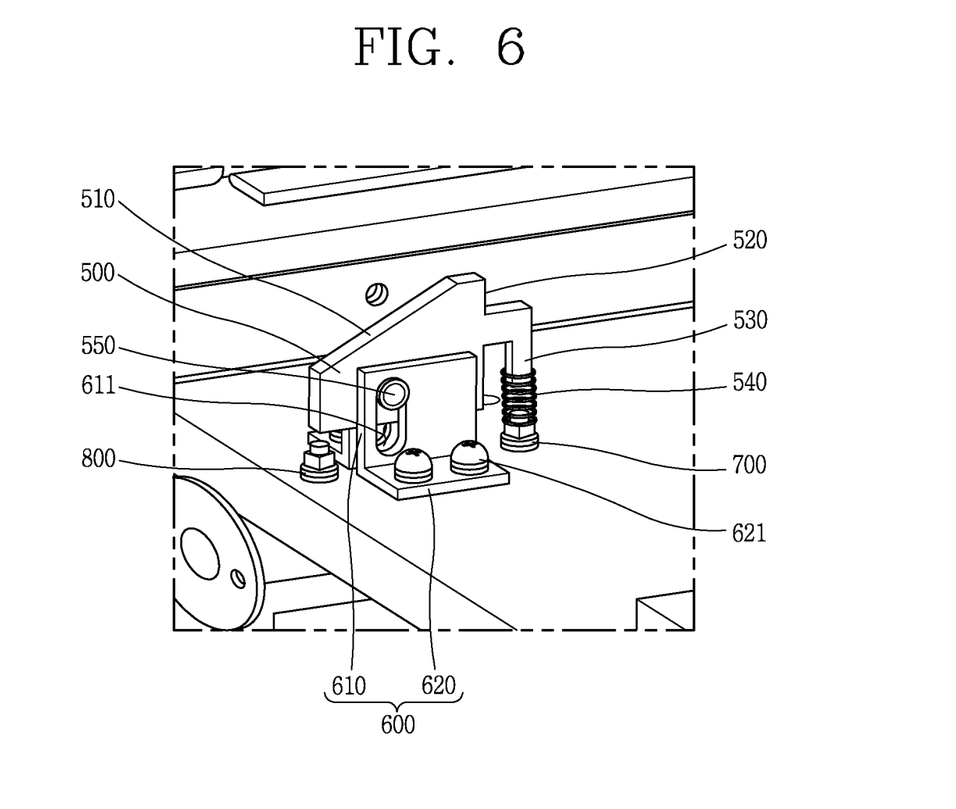
FIG. 6 is a partially enlarged view illustrating a state in which an interlock plate and a movement adjusting plate are provided within the cradle.
Figure 7A:
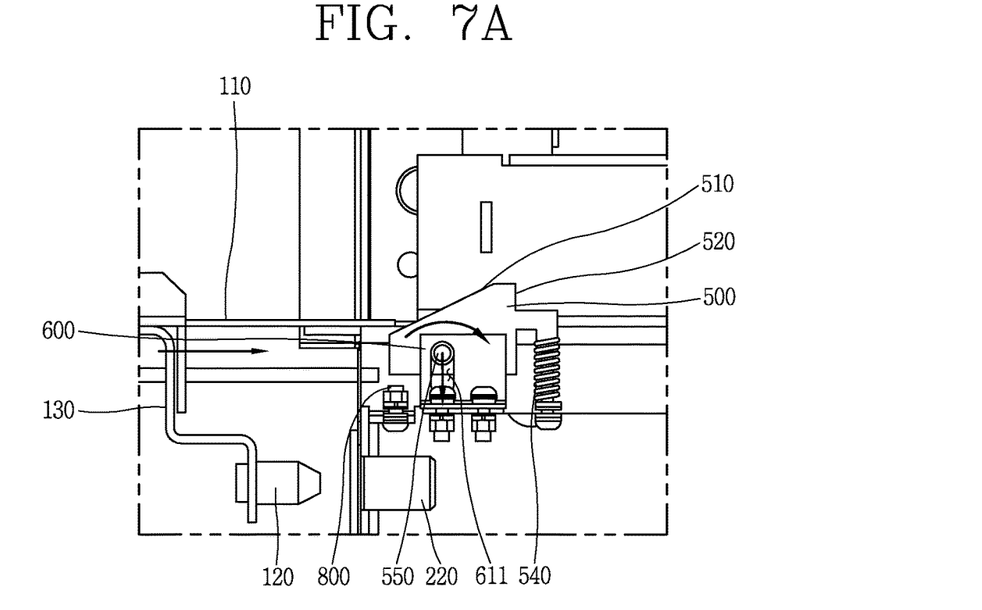
FIG. 7A is a partially enlarged view illustrating a state before a rotation adjusting plate is tightly attached to the interlock plate.
Figure 7B:
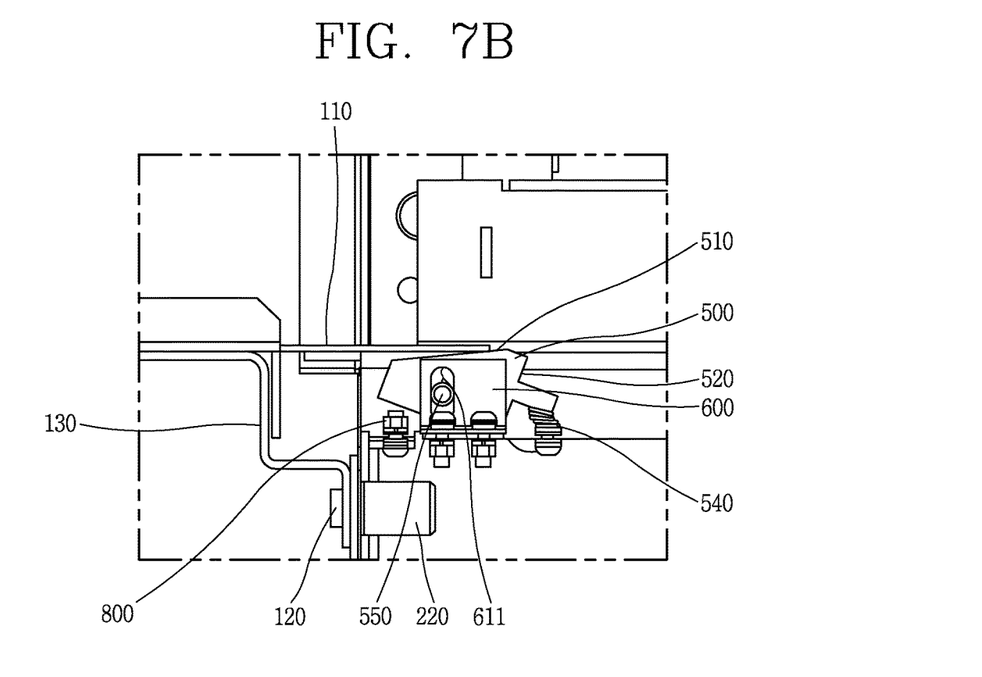
FIG. 7B is a partially enlarged view illustrating a state in which the rotation adjusting plate rotates the interlock plate.

FIG. 6 is a partially enlarged view illustrating a state in which an interlock plate and a movement adjusting plate are provided within the cradle. FIG. 7A is a partially enlarged view illustrating a state before a rotation adjusting plate is tightly attached to the interlock plate. FIG. 7B is a partially enlarged view illustrating a state in which the rotation adjusting plate rotates the interlock plate.

Figure 8A:
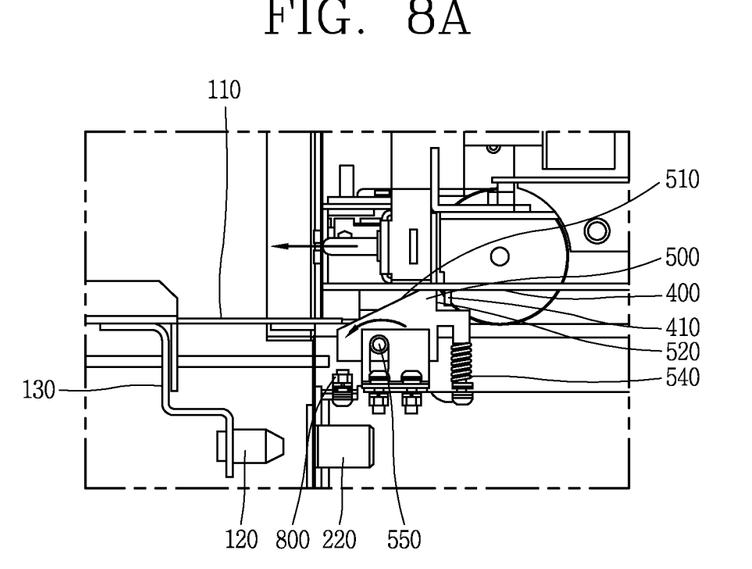
FIG. 8A is a partially enlarged view illustrating a state in which a stoppage plate is caught by a stoppage protrusion.
Figure 8B:
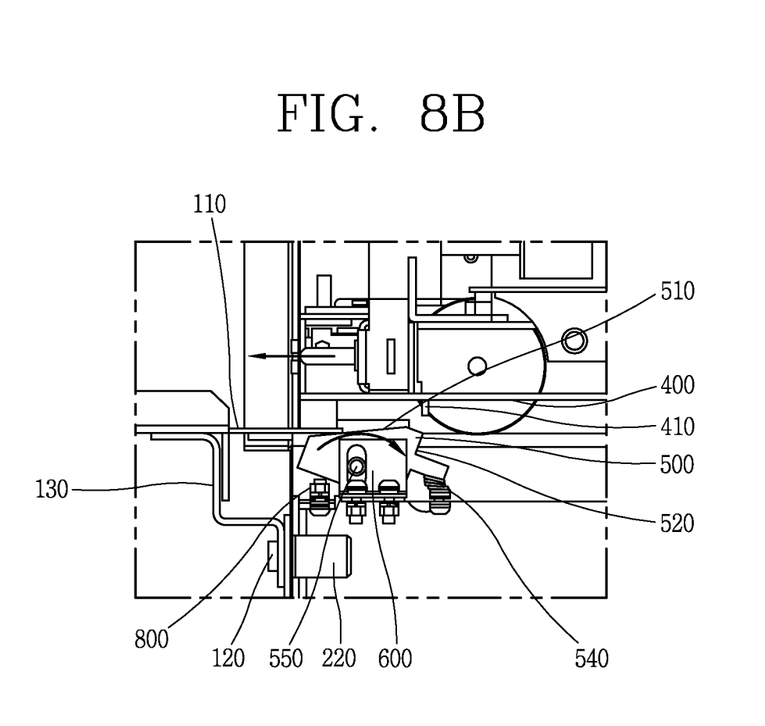
FIG. 8B is a partially enlarged view illustrating a state in which the interlock plate rotates though a rotation adjusting plate so the stoppage plate, which has been caught by the stoppage plate, is released.
Figure 9:
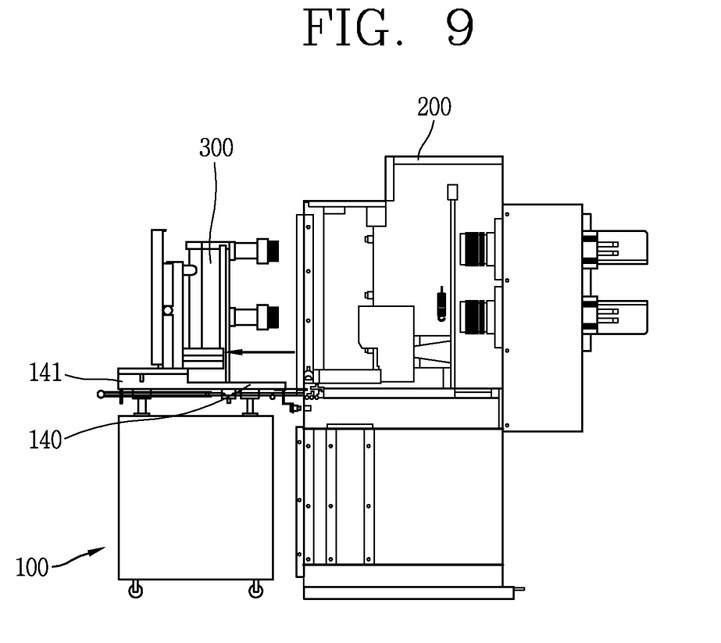
FIG. 9 is a view illustrating a state in which a circuit breaker main body drawn out from the interior of the cradle is installed in a lift.

FIG. 8A is a partially enlarged view illustrating a state in which a stoppage plate is caught by a stoppage protrusion. FIG. 8B is a partially enlarged view illustrating a state in which the interlock plate rotates though a rotation adjusting plate so the stoppage plate, which has been caught by the stoppage plate, is released. FIG. 9 is a view illustrating a state in which a circuit breaker main body drawn out from the interior of the cradle is installed in a lift.

As illustrated in FIGS. 4A and 4B, an interlock apparatus of a vacuum circuit breaker according to an embodiment of the present disclosure adjusts withdrawal of a circuit breaker main body 300 which is installed in a truck 400 within a cradle 200 and moves to be brought into contact with or separated from a terminal 210 provided within the cradle 200.

Here, the interlock apparatus includes a lift 100 on which the circuit breaker main body 300 is installed, and an interlock plate 500 rotating according to movement of the lift 100.

The lift 100 includes a plurality of wheels in a lower portion thereof. The lift 100 rotates the interlock plate 500, while moving forwardly and backwardly though the wheels, and a stopper (not shown) is provided to fix the wheels.

An installation plate 140 allowing the circuit breaker main body 300, which has been drawn out from the interior of the cradle 200, to be installed thereon is provided above the lift 100, and release preventing plates 141 are provided on both sides of the installation plate 140 in order to prevent the circuit breaker main body 300 from being released from the installation plate 140.

A quadrangular rotation adjusting plate 110 is provided below the installation plate 140 and inserted into the cradle 200 or separated from the interior of the cradle 200 according to movement of the lift 100, and an insertion bar 120 is provided below the rotation adjusting plate 110 and coupled to the cradle 200 in a state in which the lift 100 is tightly attached to the cradle 200.

Here, the insertion bar 120 is connected to the lift 100 through a support 130.

Also, an insertion bar accommodation portion 220 is formed in a position corresponding to the insertion bar 120 in the opposite direction.

Thus, when the lift 100 moves toward the cradle 200, the insertion bar 120 is inserted into the insertion bar accommodation portion 220, whereby the lift 100 is coupled to the cradle 200, and when the lift 100 moves in a direction opposite to the cradle 200, the insertion bar 120 is separated from the insertion bar accommodation portion 220, whereby the lift 100 is separated from the cradle 200.

Here, as the rotation adjusting plate 110 is inserted into the interior of the cradle 200 or separated from the interior of the cradle 200 according to movement of the lift 100, the interlock plate 500 rotates to adjust withdrawal of the circuit breaker main body 300.

Meanwhile, the interlock plate 500 is provided within the cradle 200 and rotates according to movement of the rotation adjusting plate 110 to allow the circuit breaker main body 300 is to be drawn out or limit withdrawal of the circuit breaker main body 300.

As illustrated in FIG. 6, an upwardly sloped surface 510 sloped toward a central portion from one side is formed on an upper surface of the interlock plate 500, and a stoppage protrusion 520 is formed to be spaced apart from the sloped surface 510 by a predetermined distance in an inward direction of the cradle 200.

Also, a pressing protrusion 530 is formed to be spaced apart from the stoppage protrusion 520 by a predetermined distance in an inward direction of the cradle 200 and protrude downwardly. An elastic member insertion portion 700 is formed in a position corresponding to the pressing protrusion 530, below the pressing protrusion 530. An elastic member 540 such as a spring is provided between the pressing protrusion 530 and the elastic member insertion portion 700.

Here, one end of the elastic member 540 is inserted into the pressing protrusion 530, and the other end thereof is inserted into the elastic member insertion portion 700.

Thus, as illustrated in FIGS. 7A and 7B, when the rotation adjusting plate 110 is inserted into the interior of the cradle 200 according to movement of the lift 100, the rotation adjusting plate 110 pushes the sloped surface 510 of the interlock plate 500 to rotate the interlock plate 500 in a clockwise direction, and as the interlock plate 500 is rotated, the pressing protrusion 530 downwardly presses the elastic member 540.

At this time, the interlock plate 500 is in a state of receiving elastic restoring force in a counterclockwise direction through the compressed elastic member 540.

Thereafter, when the rotation adjusting plate 110 is separated outwardly from the interior of the cradle 200 according to movement of the lift 100, the interlock plate 500 is returned to the original position upon receiving elastic restoring force in the counterclockwise direction through the elastic member 540.

Meanwhile, a movement adjusting plate 500 is further provided to be adjacent to the interlock plate 500.

The movement adjusting plate 600 includes a vertical plate 610 positioned to be parallel to the interlock plate 500 and including a long hole 611 and a horizontal plate 620 extending from a lower end of the vertical plate 610 in a horizontal direction and tightly attached to the cradle 200 through fastening members 621. An insertion member 550 is inserted into the interlock plate 500, by penetrating through the long hole 611.

Thus, when the interlock plate 500 rotates through the rotation adjusting plate 110 in the clockwise direction, the interlock plate 500 receives force downwardly according to movement of the rotation adjusting plate 110 and the insertion member 550 moves downwardly through the long hole 611, whereby the interlock plate 500 moves downwardly as soon as it rotates.

Also, when the rotation adjusting plate 110 is separated from the cradle 200, the interlock plate 500 rotates in a counterclockwise direction upon receiving elastic restoring power through elastic member 540, and at the same time, the insertion member 550 moves upwardly through the long hole 611, whereby the interlock plate 500 rotates and simultaneously moves upward so as to be returned to its original position.

Meanwhile, as illustrated in FIG. 5, a stoppage plate 410 is formed to downwardly protrude from a lower surface of the truck 400.

Thus, as illustrated in FIGS. 8A through 9, until when the lift 100 is coupled to the cradle 200, the rotation adjusting plate 110 is not inserted into the cradle 200, and thus, the interlock plate 500 is in state before being rotated through the rotation adjusting plate 110 and the stoppage protrusion 520 formed in the interlock plate 500 is positioned in front of the stoppage plate 410.

Here, when the truck 400 is moved in order to draw out the circuit breaker main body 300, the stoppage plate 410 is caught by the stoppage protrusion 520, whereby the circuit breaker main body 300 is prevented from being drawn out from the cradle 200 through the interlock plate 500.

In detail, when the stoppage protrusion 520 of the interlock plate 500 is caught by the stoppage plate 410 formed in the truck 400, the interlock plate 500 is forced in a direction in which the truck 400 moves (in a direction in which the circuit breaker main body 300 is drawn outwardly) so as to rotate in the counterclockwise direction.

Here, a rotation preventing member 800 is formed below the interlock plate 500 and a lower surface of the interlock plate 500 rotating in the counterclockwise direction comes into contact with the rotation preventing member 800, stopping rotation of the interlock plate 500, and movement of the truck 400 is also stopped through the interlock plate 500, whereby the circuit breaker main body 300 installed in the truck 400 is prevented from being drawn out from the cradle 200.

Also, when the lift 100 moves toward the cradle 200 and is coupled to the cradle 200, the rotation adjusting plate 110 is inserted into the cradle 200 to push the sloped surface 510 formed in the interlock plate 500 to rotate the interlock plate 500 in the clockwise direction, and thus, the stoppage protrusion 520 is positioned below the stoppage plate 410.

Thus, in a state in which the lift 100 is coupled to the cradle 200, although the circuit breaker main body 300 is moved to be drawn out from the cradle 200 through the truck 400, the stoppage plate 410 is not caught by the stoppage protrusion 520. Thus, the circuit breaker main body 300, without being interfered by the interlock plate 500, is drawn out from the cradle 200 and installed on the installation plate 140 of the lift 100 coupled to the cradle 200.

In the present disclosure configured and operated as described above, in a state in which the lift 100 is not coupled to the cradle 200, the truck 400 in which the circuit breaker main body 300 is installed is limited in movement through the interlock plate 500, and in a state in which the lift 100 is coupled to the cradle 200, the truck 400 in which the circuit breaker main body 300 is installed moves within the cradle 200 without being interfered by the interlock plate 500, is drawn out, and installed in a next lift 100 which has been drawn outwardly, whereby when the circuit breaker main body 300 is drawn out from the cradle 200, the circuit breaker main body 300 is supported through the lift 100 such that occurrence of an accident of an operator due to the circuit breaker main body 300 is prevented.

Also, when the circuit breaker main body 300 is drawn out, the circuit breaker main body 300 is prevented from falling and being damaged, eliminating replacement thereof with a new circuit breaker main body 300, and thus, an increase in cost can be prevented.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. An interlock apparatus of a vacuum circuit breaker for adjusting withdrawal of a circuit breaker main body, which is installed in a truck configured to move to a connected position in which the circuit breaker main body is connected to a cradle and further configured to move to a disconnected position in which the circuit breaker main body is separated from the cradle within the cradle, to outside of the cradle, the interlock apparatus comprising:

a lift comprising a rotation adjusting plate provided at an upper portion thereof, and configured to move forward and backward such that the rotation adjusting plate is inserted into the interior of the cradle or separated from the cradle; and an interlock plate provided within the cradle and configured to rotate according to movement of the rotation adjusting plate so as to be tightly attached to the truck or released from the tightly attached state and adjust withdrawal of the circuit breaker main body to the outside of the cradle, wherein:

an upper end of the interlock plate comprises an upwardly sloped surface from one side of the interlock plate toward a central portion;

a stoppage protrusion is disposed to be spaced apart from the sloped surface by a predetermined distance in an inward direction of the cradle;

a stoppage plate is disposed on a lower surface of the truck and protrudes downwardly;

the stoppage protrusion is positioned in front of the stoppage plate when the rotation adjusting plate is not inserted into the cradle such that the stoppage plate is caught by the stoppage protrusion when the circuit breaker main body moves and prevents withdrawal of the circuit breaker main body by the interlock plate, and the rotation adjusting plate is configured to push the sloped surface to rotate the interlock plate when the rotation adjusting plate is inserted into the cradle such that the stoppage protrusion is positioned below the stoppage plate, whereby the circuit breaker main body is drawn out from the cradle.

2. The interlock apparatus of claim 1, wherein:

an installation plate is disposed above the lift wherein the circuit breaker main body drawn out from the interior of the cradle is supportedly installed on the installation plate; and release preventing plates are disposed on both sides of the installation plate and configured to prevent the circuit breaker main body from being released from the installation plate.

3. The interlock apparatus of claim 1, wherein:

an insertion bar is disposed below the rotation adjusting plate adjacent to the cradle; and an insertion bar accommodation portion is disposed to face the insertion bar such that insertion bar is inserted therein.

4. The interlock apparatus of claim 1, wherein the sloped surface is rounded.

5. The interlock apparatus of claim 1, wherein a rotation preventing member is further disposed below one end of the interlock plate and configured to limit rotation when the interlock plate rotates in a counterclockwise direction through the stoppage plate.

6. The interlock apparatus of claim 1, wherein:
a pressing protrusion protrudes downwardly in the interlock plate, is disposed to be spaced apart from the stoppage protrusion by a predetermined distance in an inward direction of the cradle, and is configured to allow one side of an elastic member to be inserted therein; and
an elastic member insertion portion is disposed to be spaced apart from the pressing protrusion by a predetermined distance in a direction opposite to the pressing protrusion within the cradle and is configured to allow the other side of the elastic member to be inserted therein.

7. The interlock apparatus of claim 1, wherein:
a movement adjusting plate is disposed at a front of the interlock plate;
the movement adjusting plate is shaped to comprise a long hole such that the interlock plate moves up and down within the long hole when the interlock plate rotates; and
in a state in which the insertion member is inserted into the interlock plate by penetrating through the long hole, the insertion member is configured to move up and down within the long hole and the interlock plate is configured to simultaneously rotate and move up and down when the interlock plate rotates.

8. The interlock apparatus of claim 7, wherein the movement adjusting plate comprises:
a vertical plate shaped to comprise the long hole and positioned to be tightly attached to the interlock plate; and
a horizontal plate extending from a lower end of the vertical plate in a horizontal direction and tightly fixed to the cradle through fastening members.

* * * * *